United States Patent
Stahl et al.

(10) Patent No.: US 10,727,518 B2
(45) Date of Patent: Jul. 28, 2020

(54) FLOW-BASED ANODE FOR THE ELECTROCATALYTIC OXIDATION OF A FUEL OR OTHER REDUCTANT

(71) Applicant: Wisconsin Alumni Research Foundation, Madison, WI (US)

(72) Inventors: Shannon S. Stahl, Madison, WI (US); James B. Gerken, Madison, WI (US); Colin W. Anson, Madison, WI (US); Thatcher W. Root, Madison, WI (US); Yuliya Preger, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 225 days.

(21) Appl. No.: 16/005,783

(22) Filed: Jun. 12, 2018

(65) Prior Publication Data
US 2018/0358642 A1    Dec. 13, 2018

Related U.S. Application Data
(60) Provisional application No. 62/518,032, filed on Jun. 12, 2017.

(51) Int. Cl.
| | | |
|---|---|---|
| *H01M 8/18* | (2006.01) | |
| *H01M 8/20* | (2006.01) | |
| *H01M 4/60* | (2006.01) | |
| *H01M 4/58* | (2010.01) | |
| *H01M 4/36* | (2006.01) | |
| *H01M 8/1018* | (2016.01) | |

(52) U.S. Cl.
CPC ............. *H01M 8/20* (2013.01); *H01M 4/368* (2013.01); *H01M 4/5825* (2013.01); *H01M 4/60* (2013.01); *H01M 2008/1095* (2013.01)

(58) Field of Classification Search
CPC ....................................................... H01M 8/18
See application file for complete search history.

(56) References Cited

U.S. PATENT DOCUMENTS

| | | |
|---|---|---|
| 3,682,704 A | 8/1972 | Keefer |
| 4,396,687 A | 8/1983 | Kummer et al. |
| 5,660,940 A | 8/1997 | Larsson et al. |
| 6,187,170 B1 | 2/2001 | Hampp |

(Continued)

*Primary Examiner* — Jacob B Marks
(74) *Attorney, Agent, or Firm* — Boyle Fredrickson S.C.

(57) ABSTRACT

Anode half-cells for the electrocatalytic oxidation of a liquid or gaseous fuel or other reductant are disclosed, along with electrochemical cells that include such half-cells. The anode half-cells include redox mediator/heterogeneous redox catalyst pairs within an electrolyte solution that is also in contact with an electrode. The electrode is not in direct contact with the heterogeneous catalyst. The redox mediator must include at least one carbon atom and be capable of transferring or accepting electrons and protons while undergoing reduction or oxidation.

In operation, the fuel or other reductant is oxidized and the redox mediator is reduced at the heterogeneous catalyst. The reduced form of the redox mediator can then migrate to the electrode, where it is converted back to its oxidized form, which can then migrate back to the heterogeneous catalyst, where the cycle is repeated. The disclosed anode half-cells can be used in electrochemical cells, such as in fuel cells that produce electricity, or in electrosynthetic cells that produce one or more desired chemical products.

20 Claims, 11 Drawing Sheets

(56) References Cited

U.S. PATENT DOCUMENTS

| | | |
|---|---|---|
| 8,404,396 B2 | 3/2013 | Watt et al. |
| 8,492,048 B2 | 7/2013 | Knuckey et al. |
| 2008/0274385 A1 | 11/2008 | Creeth |
| 2009/0278556 A1 | 11/2009 | Man et al. |
| 2010/0112388 A1 | 5/2010 | Knuckey et al. |
| 2010/0297522 A1 | 11/2010 | Creeth et al. |
| 2015/0263371 A1* | 9/2015 | Stahl .................. H01M 8/188 429/498 |
| 2016/0344055 A1 | 11/2016 | Deng et al. |

\* cited by examiner

FLOW-BASED ANODE FOR THE ELECTROCATALYTIC OXIDATION OF A FUEL OR OTHER REDUCTANT

CROSS-REFERENCE TO RELATED APPLICATIONS

This application claims the benefit of U.S. provisional Application No. 62/518,032 filed on Jun. 12, 2017, which is hereby incorporated by reference herein in its entirety.

STATEMENT REGARDING FEDERALLY SPONSORED RESEARCH/DEVELOPMENT

This invention was made with government support under DE-AC05-76RL01830 awarded by the US Department of Energy. The government has certain rights in the invention.

BACKGROUND OF THE INVENTION

The present disclosure relates to anode half-cell reactions (oxidations of fuel or other reductants) in fuel or other electrochemical cells. More particularly, it relates to expanding the scope of fuels or other reductants that are usable by utilizing a flow-based anode half-cell where the fuel or other reductant oxidation occurs away from the electrode (the anode). This is accomplished by using a carbon-containing redox mediator that is capable of transferring electrons and protons, in combination with a heterogeneous redox catalyst that is not in direct contact with the anode.

Fuel cells are comprised of two half-cells, with an electrolyte separating them that allows for ions to flow. At the anode, a fuel or reductant (with typical examples of fuels including but not limited to: hydrogen, methane, methanol, or biomass) is oxidized, and at the cathode, oxygen or another oxidizing agent is reduced. Electrons flow from the anode to the cathode through an external circuit, and ions flow between the anode and cathode to maintain charge balance between the respective half-cells. The electricity generated from the flow of electrons can be used in a variety of applications, such as for generating primary or backup electrical power in stationary or mobile applications and supplying the electricity needed to power an electric vehicle, such as a forklift or an automobile.

For most conventional PEM (polymer electrolyte membrane) fuel cells, both the fuel ($H_2$) and air or $O_2$ are introduced as gases, and undergo oxidation or reduction, respectively, at gas diffusion electrodes containing platinum. A subset of PEM fuel cells, which use solutions of methanol as the fuel, typically use Pt or Pt alloyed with Ru as electrocatalysts for fuel oxidation. Some other fuels have been considered, such as formic acid; however, $H_2$ and methanol (MeOH) are the most frequently studied fuels. The anode chemistry for conventional PEM fuel cells using $H_2$ as a gas is quite well developed, and this chemistry is not frequently seen as limiting fuel cell usage. $H_2$ has several promising characteristics as a fuel for fuel cells, including its good energy density, its innocuous byproducts, and the potential for being sourced from renewable sources. However, there are also complications associated with using $H_2$ as a fuel. For example, it is a flammable gas that is difficult to store. The infrastructure for $H_2$ delivery is also less developed than the infrastructure for liquid fuels, meaning it can be less accessible or more expensive. For this reason, using a liquid fuel such as MeOH would be advantageous.

Liquid fuels (or solutions of fuels) have the previously discussed advantage of easier distribution than $H_2$, with MeOH being a very attractive fuel. However, a major difficulty in using MeOH is the crossover of MeOH from the anode half-cell to the cathode half-cell, where it poisons the Pt catalysts typically used to reduce $O_2$ at the cathode. Other potential fuel sources, such as biomass, typically contain impurities that are capable of poisoning both the anodic and cathodic electrocatalysts. Due to this poisoning, lower concentrations of fuels are used, which decreases the power output of the fuel cell.

One strategy for decreasing the poisoning due to crossover and to extend the range of fuels able to be oxidized in a fuel cell is to move the fuel oxidation reaction (and, optionally, the $O_2$ reduction) off of the electrode. This strategy uses a redox mediator capable of transferring protons and electrons that can shuttle electrons from the fuel to the anode. The fuel oxidation is assisted by a redox catalyst. The oxidation of the fuel supplies the reducing equivalents capable of reducing the redox mediator, which is then reoxidized at the anode.

There have been previous efforts to move fuel oxidation (and in some of the same systems, $O_2$ reduction) off of the corresponding electrode.

U.S. Pat. No. 3,682,704 discloses a redox anode containing Cu or Ag salts as combined redox mediator/catalysts and sugars as the fuel that is oxidized. The catholyte solution additionally contains Cu, Fe, or Ag as redox mediators for $O_2$ reduction.

U.S. Pat. No. 4,396,687 discloses a redox anode utilizing a silicon-based polyoxometalate redox mediator with a Pt-based redox catalyst for $H_2$ oxidation. Vanadium salts are used as redox mediators in the cathode, with a polyoxometalate-based redox catalyst for $O_2$ reduction.

U.S. Pat. No. 5,660,940 discloses a redox fuel cell using carbohydrates as fuels, a Pt-based redox catalyst, and vanadium salts as the redox mediator in the anode. Vanadium salts are also used as a redox mediator in the cathode, where nitric oxide or a metal phthalocyanine redox catalyst are proposed for $O_2$ reduction.

A fuel cell utilizing viologen-based redox mediators for the oxidation of glucose under basic conditions is reported in U.S. Pat. No. 8,404,396.

A biomass-based fuel cell utilizing polyoxometalates as redox mediators for the oxidation of a variety of biomass is reported in U.S. Pat. Appl. 2016/0,344,055. Polyoxometalate mediators are also used in the cathode compartment.

However, each of these examples suffers from various disadvantages. These factors include high molecular weight of the mediators relative to the number of electrons they can transport, high cost, low stability, inability to tune the redox properties, and insufficient current/power densities.

In U.S. Patent Publication No. 2015/0263371, which is incorporated by reference herein, we disclosed a strategy specific to $O_2$ reduction at the cathode using specific classes of redox mediators in combination with redox catalysts that were not attached to the cathode. Notably, the disclosed strategy would not have been expected to work for the oxidation of a fuel or other reductant in a cathode half-cell.

Accordingly, there remains a need for electrochemical cells having improved anode half-cell performance, for the more efficient electrocatalytic oxidation of fuels or other reductants.

BRIEF SUMMARY

In a first aspect, this disclosure encompasses an anode half-cell for oxidizing a fuel or other reductant. The anode half-cell includes an electrolyte solution (anolyte) that is in contact with an electrode (anode) and a heterogeneous redox catalyst, where the electrode is not in direct contact with the heterogeneous redox catalyst, along with a carbon-containing redox mediator that is capable of transferring or accepting electrons and protons while undergoing oxidation or reduction.

In some embodiments, the redox mediator is dissolved within the electrolyte solution and is capable of moving between the electrode and the heterogeneous redox catalyst.

In some embodiments, the anode half-cell further includes a fuel or other reductant. In some such embodiments, the fuel or other reductant is in contact with the heterogeneous redox catalyst. In some embodiments, the fuel or other reductant is in the form of a gas or a liquid, optionally as a solution of a solid fuel dissolved in the liquid electrolyte.

In some embodiments, the oxidized form of the redox mediator is being reduced and the fuel or other reductant is being oxidized at the heterogeneous redox catalyst.

In some embodiments, the reduced form of the redox mediator is being oxidized at the anode electrode, and the oxidized form of the redox mediator is being reduced at the heterogeneous redox catalyst.

In some embodiments, the reduced form of the redox mediator is a substituted dihydroxybenzene, a substituted hydrazine, a substituted hydroxylamine, or a substituted heterocycle, such as dihydropyridines, dihydroflavins, or dihydroindigos. In some such embodiments, the substituted dihydroxybenzene is a 1,2-dihydroxybenzene or a 1,4-dihydroxybenzene.

In some embodiments, the substituted dihydroxybenzene has one or more dihydroxybenzene hydrogen atoms on the ring substituted with a substituent group that is independently an alkyl with less than ten carbons, an aryl, a fused aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, or combinations of two or more of the foregoing; and at least one of the substituent groups is charged to increase the aqueous solubility of the substituted dihydroxybenzene.

In some embodiments, the fused aryl is naphthohydroquinone, anthrahydroquinone, or a derivative thereof.

In some embodiments, the substituted hydrazine has one or more hydrazine hydrogen atoms substituted with a substituent group that is independently an alkyl with less than ten carbons, an aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, or combinations of two or more of the foregoing; and at least one of the substituent groups is charged to increase the aqueous solubility of the substituted hydrazine.

In some embodiments, the substituted hydroxylamine has one or more nitrogen-bound hydroxylamine hydrogen atoms substituted with a substituent group that is independently an alkyl with less than ten carbons, an aryl, a cycloalkyl, or a bicycloalkyl. In some such embodiments, both nitrogen-bound hydroxylamine hydrogen atoms are substituted with (a) the same substituents, (b) different substituents, or (c) substituents that are linked together to form a heterocycle. In some embodiments, one or more of the substituent groups further includes an alkyl with less than ten carbons, an aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, or combinations of two or more thereof on the same or on different positions on the substituent; and at least one of the substituents is charged to increase the aqueous solubility of the substituted hydroxylamine.

In some embodiments, substituted heterocycle, such as dihydropyridine, dihydroflavin, or dihydroindigo has one or more hydrogen atoms of the heterocycle substituted with a substituent group that is an alkyl with less than ten carbons, an aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, or combinations of two or more thereof on the same or on different positions on the substituent; and at least one of the substituents is charged to increase the aqueous solubility of the substituted heterocycle.

In some embodiments, the heterogeneous redox catalyst includes one or more metals selected from Pt, Pd, Ru, Co, Mn, Fe, Cu, V, Mo, Rh, Ag, Au, W, Os, Ni, Cr, or Ir.

In some embodiments, the heterogeneous redox catalyst is deposited, adsorbed, covalently linked, or otherwise attached to a support. In some such embodiments, the support is a carbon-based material, silica, a metal oxide, a metal chalcogenide, an oxynitride, a nitride, a boride, or a carbide.

In some embodiments, the heterogeneous redox catalyst is a heterogenized molecular catalyst.

In some embodiments, the anode half-cell includes an anode flow reactor containing the heterogenous redox catalyst. The anode flow reactor is configured to facilitate contact of the heterogenous redox catalyst with a flowing fluid comprising the electrolyte solution, the redox mediator, and a fuel or other reductant. In some such embodiments, the anode flow reactor includes the flowing fluid comprising the electrolyte solution, the redox mediator, and the fuel or other reductant. In some such embodiments, the fuel or other reductant is being oxidized at the heterogeneous redox catalyst, and the redox mediator is being reduced at the heterogeneous redox catalyst.

In a second aspect, the disclosure encompasses an electrochemical cell that includes an anode half-cell as described above in ionic communication with a cathode half-cell. In some embodiments, the electrochemical cell is a fuel cell or an electrosynthetic cell.

In some embodiments, the electrochemical cell further includes: (1) a cathode inlet configured to allow $O_2$ or air to flow into the cathode half-cell, whereby $O_2$ can be reduced; (2) an anode inlet configured to allow a gaseous or liquid fuel (optionally, a solution of a solid fuel dissolved in the liquid electrolyte) or other reductant to be delivered to the anode half-cell, whereby the fuel or other reductant can be oxidized; (3) a semi-permeable membrane separating the anode half-cell and the cathode half-cell; and (4) an external electrical circuit connecting the anode half-cell and the cathode half-cell.

In some embodiments, the cathode half-cell includes a conventional PEM fuel cell cathode electrode that includes an electrocatalyst capable of reducing $O_2$.

In some embodiments, the cathode half-cell includes: (1) an electrolyte solution (catholyte) that is in contact with a cathode electrode (cathode) and a heterogeneous redox catalyst, wherein the cathode electrode is not in direct contact with the heterogeneous redox catalyst; and (2) a carbon-containing redox mediator that is capable of transferring or accepting electrons and protons while undergoing reduction or oxidation.

In some embodiments, the electrochemical cell further includes $O_2$. In some such embodiments, the $O_2$ is in contact with the heterogeneous redox catalyst of the cathode. In some such embodiments, the reduced form of the redox mediator is being oxidized and the $O_2$ is being reduced at the heterogeneous redox catalyst of the cathode.

In some embodiments, the cathode half-cell includes an electrolyte solution (catholyte) that contains a soluble redox mediator and/or redox catalyst that is in contact with a cathode electrode (cathode).

In some embodiments, the electrochemical cell further includes $O_2$. In some such embodiments, the $O_2$ is in contact with the soluble redox mediator and/or redox catalyst. In some such embodiments, the reduced redox mediator and/or redox catalyst is being oxidized by $O_2$ and $O_2$ is reduced.

In a third aspect, the disclosure encompasses a method of producing electricity. The method includes the steps of contacting the heterogeneous redox catalyst of the anode half-cell of an electrochemical cell as described above with a fuel or other reductant, and contacting the cathode half-cell of the electrochemical cell with $O_2$. As these steps are performed, the fuel or other reductant is oxidized, $O_2$ is reduced, and electricity is produced.

In a fourth aspect, the disclosure encompasses a method of producing a desired chemical product. The method includes the steps of contacting the heterogeneous redox catalyst of the anode half-cell of an electrochemical cell as described above with a reductant that is a precursor of the desired chemical product, and contacting the cathode half-cell of the electrochemical cell with $O_2$. As these steps are performed, the precursor is oxidized to the desired product, and the $O_2$ is reduced.

In sum, we have discovered that it is desirable for a half-cell used for electrocatalytic fuel or other reductant oxidation to include a redox mediator/heterogeneous redox catalyst pair, along with an anode electrode that is not in direct contact with the heterogeneous redox catalyst and an electrolyte (anolyte).

The above and still other advantages of the present disclosure will be apparent from the description that follows.

For example, altering substituents on the redox mediator can tailor the mediator performance for particular needs.

The following description is merely of specific embodiments. The claims should therefore be looked to in order to understand the full scope of the invention.

DETAILED DESCRIPTION

I. In General

Figure 1:
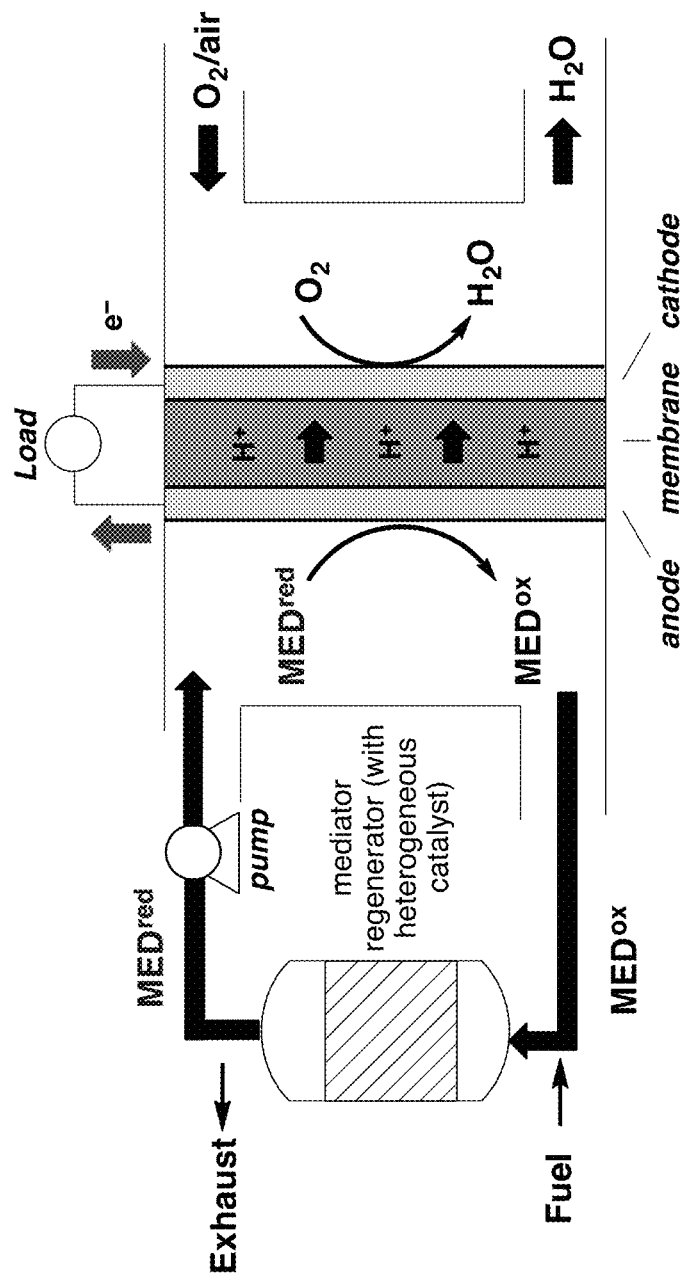
FIG. 1 depicts a general scheme for a flow-anode based fuel cell with a conventional cathode.

The disclosed devices and methods are not limited to the particular methodology, protocols, materials, and reagents described, as these may vary. Furthermore, the terminology used herein is for the purpose of describing particular embodiments only, and is not intended to limit the scope of the present invention which will be limited only by the pending claims.

As used herein and in the appended claims, the singular forms "a", "an", and "the" include plural reference unless the context clearly dictates otherwise. As well, the terms "a" (or "an"), "one or more" and "at least one" can be used interchangeably herein. The terms "comprising", "including", and "having" can be used interchangeably.

Unless defined otherwise, all technical and scientific terms used herein have the same meanings as commonly understood by one of ordinary skill in the art. Although any methods and materials similar or equivalent to those described herein can be used in the practice or testing of the present invention, the methods and materials of several embodiments are now described. All publications and patents specifically mentioned herein are incorporated by reference in their entirety for all purposes.

II. The Invention

This disclosure is based on the inventors' discovery that a heterogeneous redox catalyst that is not in direct with an anode electrode can be paired with a redox mediator to facilitate the electrocatalytic oxidation of a fuel or other reductant in an anode half-cell. Accordingly, the disclosure encompasses an anode half-cell comprising an anode electrode and a redox catalyst that is not in direct contact with the anode electrode, along with an electrolyte (anolyte) in contact with the electrode and the heterogeneous redox catalyst. The electrolyte contains a carbon-containing redox mediator in an oxidized, reduced, or intermediate forms (i.e., various "redox forms"). Accordingly, when a redox mediator is identified in a particular form herein, such identification also includes the corresponding alternative redox forms, each of which would be readily apparent to one skilled in the art.

In the operation of the anode half-cell in a voltaic cell that produces electricity, such as a fuel cell, the fuel or other reductant is oxidized at the heterogeneous redox catalyst, where the oxidized form of the redox mediator is simultaneously reduced. The reduced form of the redox mediator can subsequently migrate through the electrolyte to the anode electrode, where it is converted back to the oxidized form, and the resulting electrons are deposited onto the anode electrode. The oxidized form of the redox mediator can then migrate back to the heterogeneous redox catalyst, where the cycle is repeated. By repeating the process, the carbon-containing redox mediator can undergo a large number of oxidation/reduction cycles.

The disclosed anode half-cells are not limited to use in voltaic cells; they may also be used in electrolytic cells that require the input of electricity, such as electrosynthetic cells. In the operation of the anode half-cell in an electrolytic cell, an external electromotive force (EMF) removes electrons from the anode electrode, resulting in the oxidation of the reduced form of the redox mediator. The resulting oxidized form of the redox mediator can then migrate to the heterogeneous redox catalyst, where the oxidized form is converted to the reduced form and the reductant is simultaneously oxidized. The reduced form of the redox mediator may then migrate back to the anode electrode, where the cycle may be repeated. In both the voltaic cell and electrolytic cell applications the cycle chemistry is the same. The only difference is that in the electrolytic cell, the chemistry is driven by the external EMF, while in the voltaic cell, the cycle is driven by the favorable thermodynamics of the net reaction of the cell.

Because in the disclosed anode half-cell, the heterogeneous redox catalyst is separate from the anode electrode, the anode electrode itself need not act as redox catalyst. Thus, the type of electrode used is not limited, and may comprise any electrode material that is typically used in the art.

As a non-limiting example, the disclosed anode-half can be used in a fuel cell where the anode contains an aqueous solution containing a dissolved carbon-containing redox mediator and a heterogeneous redox catalyst, which can oxidize the fuel and is not in direct contact with the anode. In operation, the redox mediator is oxidized at the anode and reduced by contact with the redox catalyst, optionally in a flow reactor. The fuel can be introduced as a gas, liquid, or solution. The cathode consists of either a heterogeneous electrocatalyst for $O_2$ reduction, a redox cathode as described in our previous patent, U.S. Pat. No. 9,711,818, which is incorporated by reference herein, or a redox cathode containing a polyoxometalate-based redox mediator/cathode. The anode and cathode are separated by a permeable membrane. If the anode solution (and cathode solution, if a redox cathode is used) is acidic, a proton-exchange membrane should be used, and if the solution(s) are basic, an anion-exchange membrane should be used.

A. The Carbon-Containing Redox Mediator

In some embodiments, the reduced form of the redox mediator is selected from a substituted dihydroxybenzene, substituted hydrazine, substituted hydroxylamine, and a substituted heterocycle, such as a dihydropyridine, dihydroflavin, or dihydroindigo. Preferential substitution of the hydroxyl groups on the dihydroxybenzene include 1,2- and 1,4-substitution.

In embodiments where the reduced form of the redox mediator is a substituted dihydroxybenzene, one or more hydrogen atoms on the ring of the dihydroxybenzene is substituted with a substituent group. Exemplary substituent groups that could be independently substituted for each hydrogen atom include an alkyl with less than ten carbons, an aryl, fused aryl (e.g. naphthohydroquinone or anthrahydroquinone and derivatives thereof), a fused heteroaryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, or a nitro. Additionally, under acidic conditions the substituents (—R groups) on the mediator should be at least partially anionic; and if the solution is basic the substituents should be at least partially cationic.

Exemplary redox mediators where the reduced form is a substituted dihydroxybenzene include, without limitation, anthrahydroquinone-2,7-disulfonic acid, 1,8-dihydroxy-anthrahydroquinone-2,7-disulfonic acid, anthrahydroquinone-2-sulfonic acid, or salts thereof.

In embodiments where the reduced form of the redox mediator is a substituted hydrazine, one or more hydrogen atoms in the hydrazine is substituted with a substituent group. Exemplary substituent groups that could be independently substituted for each hydrogen atom include an alkyl with less than ten carbons, an aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, and combinations of two or more thereof on the same or on different positions on the substituent and at least one of the substituents is charged to increase the aqueous solubility of the hydrazine.

In embodiments where the reduced form of the redox mediator is a substituted hydroxylamine, one or more nitrogen-bound hydrogen atoms in hydroxylamine is substituted with a substituent group. Exemplary substituent groups that could be independently substituted for each hydrogen include an alkyl with less than ten carbons, an aryl, a cycloalkyl, and a bicycloalkyl. In some embodiments, the same substituent group may substitute for two different hydrogen atoms, thus forming a heterocycle. In some embodiments, at least one form of the redox mediator may be a stable radical.

In some embodiments where the reduced form of the redox mediator is a substituted hydroxylamine, one or more of the substituent groups may further include an alkyl with less than ten carbons, an aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, and combinations of two or more thereof on the same or on different positions on the substituent. Additionally, under acidic conditions the substituents (—R groups) on the mediator should be at least partially anionic; and if the solution is basic the substituents should be at least partially cationic.

In some embodiments where the reduced form of the redox mediator is a substituted heterocycle, such as dihydropyridine, dihydroflavin, or dihydroindigo, one or more of the substituent groups may further include an alkyl with less than ten carbons, an aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, and combinations of two or more thereof on the same or on different positions on the substituent. Additionally, under acidic conditions the substituents (—R groups) on the mediator should be at least partially anionic; and if the solution is basic the substituents should be at least partially cationic.

B. The Heterogeneous Redox Catalyst

In some embodiments, the redox catalyst includes one or more metals. In some such embodiments, the one or more metals may include platinum (Pt), palladium (Pd), ruthenium (Ru), cobalt (Co), manganese (Mn), iron (Fe), copper (Cu), vanadium (V), molybdenum (Mo), rhodium (Rh), silver (Ag), gold (Au), tungsten (W), osmium (Os), nickel (Ni), chromium (Cr), or iridium (Ir).

In some embodiments, the catalyst is heterogeneous and in contact with the liquid electrolyte but not in direct physical contact with the electrode.

In some embodiments, the redox catalyst contains a metal that is heterogenized through deposition, adsorption, covalent linking, or otherwise attached to a support.

In some embodiments the support is a carbon-based material, silica, a metal oxide, a metal chalcogenide, a nitride, an oxynitride, a boride, or a carbide.

In some embodiments, the redox catalyst is housed in a reactor through which both the mediator and fuel flow in order to reduce the oxidized redox mediator and to oxidize the fuel.

C. The Fuel or Other Reductant

The disclosed devices and methods are not limited to using a specific fuel or other reductant. Non-limiting examples of fuels or other reductants that could be used include $H_2$, formic acid, methanol, ethanol, glycerol, glucose, paraformaldehyde, polyoxymethylene dimethyl ether, and 1,3,5-trioxane.

The following examples are offered for illustrative purposes only, and are not intended to limit the scope of the present invention in any way. Indeed, various modifications of the disclosed method in addition to those shown and described herein will become apparent to those skilled in the art from the foregoing description and the following examples and fall within the scope of the appended claims.

EXAMPLE 1

Mediated Anode with Conventional Cathode

FIG. 1 depicts a general scheme for a regenerative redox anode fuel cell with a conventional cathode.

Figure 2:
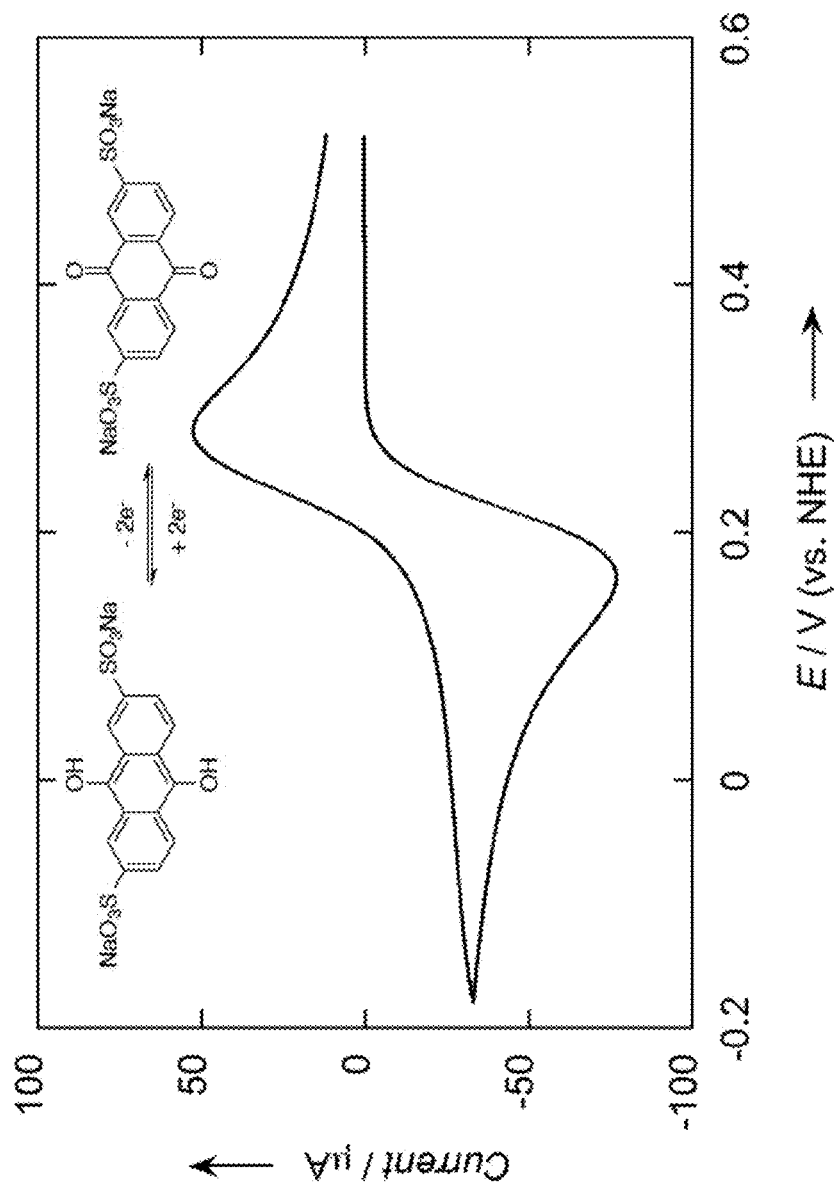
FIG. 2 depicts a cyclic voltammogram of 10 mM anthraquinone-2,7-disulfonic acid, disodium salt at 10 mV/s in aqueous 1 M $H_2SO_4$.
Figure 3:
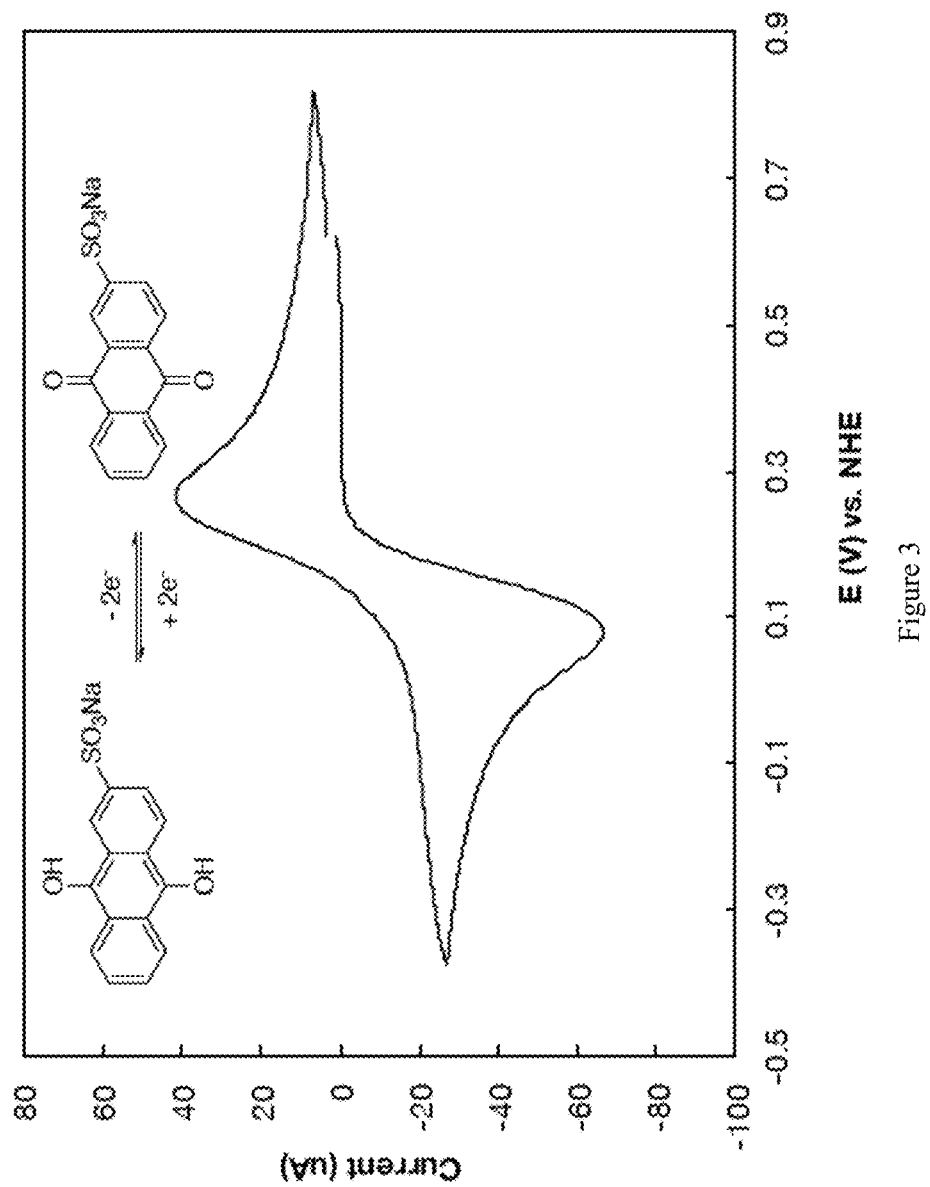
FIG. 3 depicts a cyclic voltammogram of 10 mM anthraquinone-2-sulfonic acid, sodium salt at 10 mV/s in aqueous 1 M $H_2SO_4$.

In one example, 10 mM of anthraquinone-2,7-disulfonic acid, disodium salt was dissolved in water, with 1 M $H_2SO_4$ as supporting electrolyte. Cyclic voltammetry (CV) measurements were carried out at a glassy carbon electrode, with a Pt wire counter electrode and an Ag/AgCl reference electrode. Oxidation and reduction peaks corresponding to formation and consumption of the corresponding hydroquinone were observed with an $E_{1/2}$ of 224 mV vs. NHE (FIG. 2). A similar experiment carried out with anthraquinone-2-sulfonic acid, sodium salt yielded an $E_{1/2}$ of 164 mV vs. NHE (FIG. 3).

Figure 4:
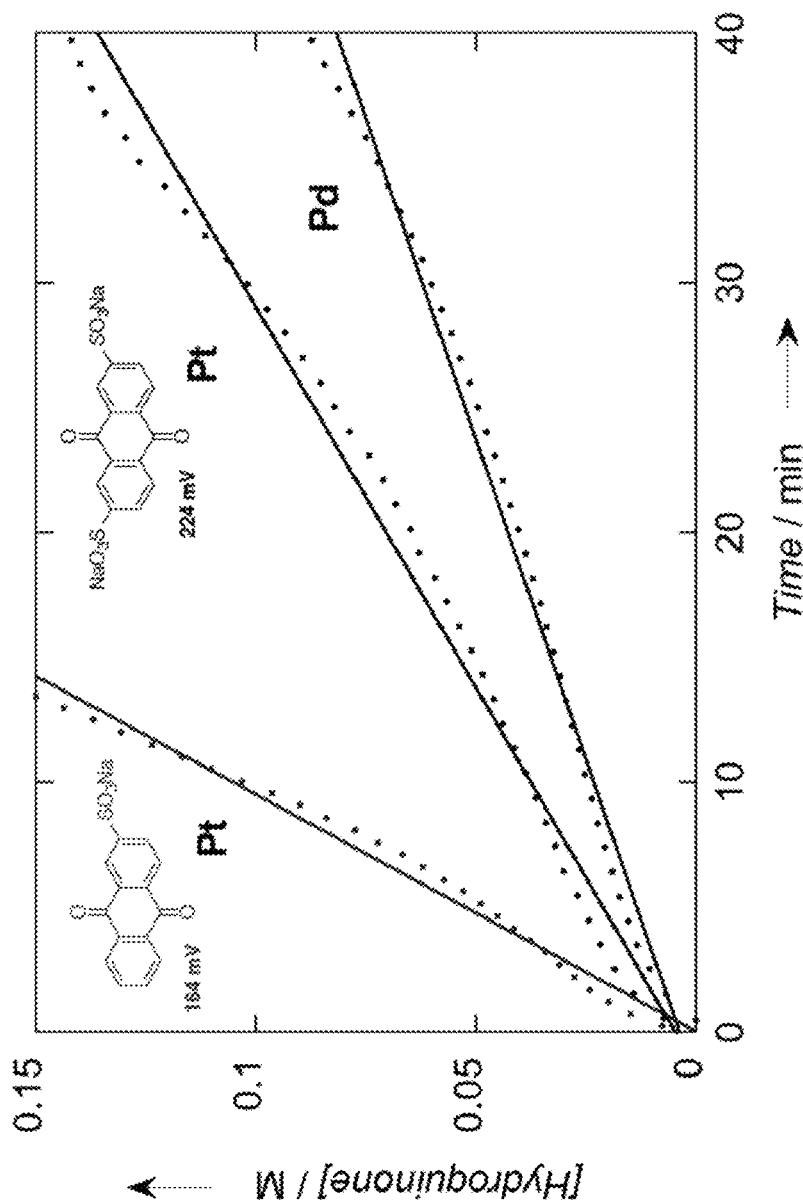
FIG. 4 depicts time courses of the hydrogenation of different anthraquinones by various heterogeneous catalysts in aqueous 1 M $H_2SO_4$.

In another example, heterogeneous catalysts were shown to hydrogenate low potential anthraquinones under acidic conditions. A solution of 0.25 M anthraquinone-2,7-disulfonic acid, disodium salt in 1 M $H_2SO_4$ was combined in a vial with 0.5 mol % of a Pt catalyst dispersed on carbon (10 wt. %). Hydrogen was bubbled into the vial at room temperature. To monitor the extent of the anthraquinone reduction, a working electrode (glassy carbon) and a reference electrode (Ag/AgCl) were placed into the vial, and connected to a multimeter. The measured potential was converted to a quinone:hydroquinone ratio using the Nernst equation. A similar experiment was carried out with anthraquinone-2-sulfonic acid, sodium salt and the same Pt/C catalyst, as well as anthraquinone-2,7-disulfonic acid, disodium salt with 0.5 mol % of a Pd catalyst dispersed on carbon (5 wt. %). In all cases, the anthraquinone was successfully reduced and the reaction progress over time is shown in FIG. 4.

In another example, anthraquinone-2,7-disulfonic acid, disodium salt was implemented in a regenerative redox anode with a conventional cathode. We paired this anthraquinone mediator with a redox catalyst consisting of Pt supported on carbon (Pt/C). A reservoir beaker was filled with 0.1 M of the anthraquinone disulfonic acid disodium salt in 1 M $H_2SO_4$. A pump circulated the contents of the beaker through a reactor containing 0.1 g of Pt dispersed on carbon (10 wt. % loading). Hydrogen was metered in co-current flow to the electrolyte. After reacting over the catalyst, the electrolyte was returned to the reservoir.

To monitor the extent of the anthraquinone reduction, a working electrode (glassy carbon) and a reference electrode (Ag/AgCl) were placed into the reservoir, and the reservoir potential measured using a multimeter. The measured potential was converted to a quinone:hydroquinone ratio using the Nernst equation.

Figure 5:
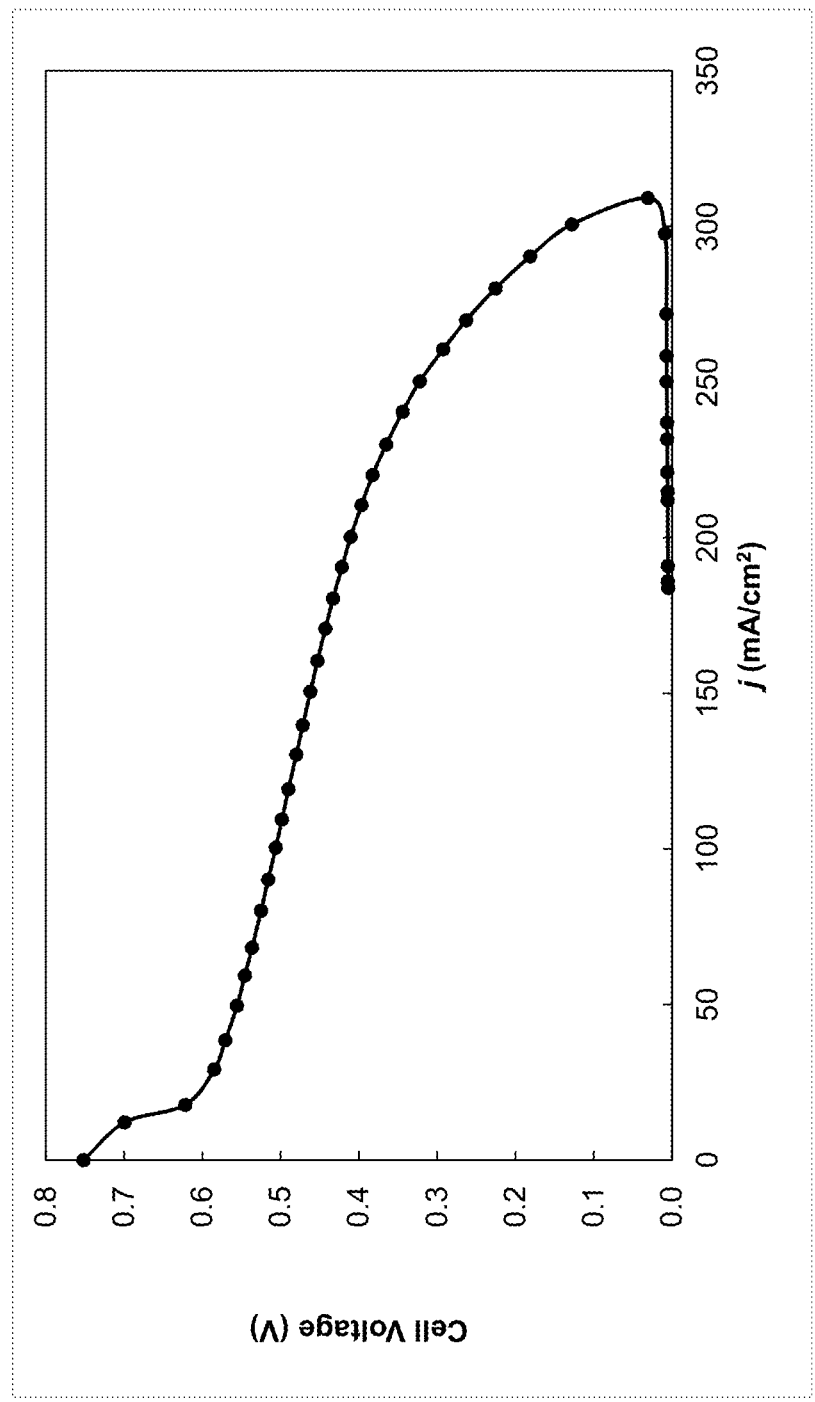
FIG. 5 depicts a voltage-current density plot for a fuel cell with a flow anode using anthraquinone-2,7-disulfonic acid, disodium salt as the redox mediator and $H_2$ as fuel with a conventional cathode.

Once the reservoir contained at least 50% hydroquinone (according to the measured potential), another pump was turned on and circulated the contents of the reservoir to the anode side of a fuel cell. The fuel cell consisted of a membrane electrode assembly (MEA) of Nafion®117 (Dupont). On the cathode side, a carbon fiber cloth containing 0.20 mg Pt/cm$^2$ was hot pressed onto the membrane. On the anode side, carbon fiber cloth was laid against the membrane without hot pressing. Both sides had an electrode area of 5 cm$^2$ and used serpentine flow plates. $O_2$ was reduced directly at the cathode electrode and the fuel cell was heated to 60° C. At the anode electrode, the hydroquinone was oxidized to the quinone and the electrolyte was circulated back to the reservoir. A voltage-current density plot was generated during simultaneous operation of the reactor and the fuel cell (FIG. 5).

EXAMPLE 2

Anthraquinone Mediated Anode with Quinone Mediated Cathode

Figure 6:
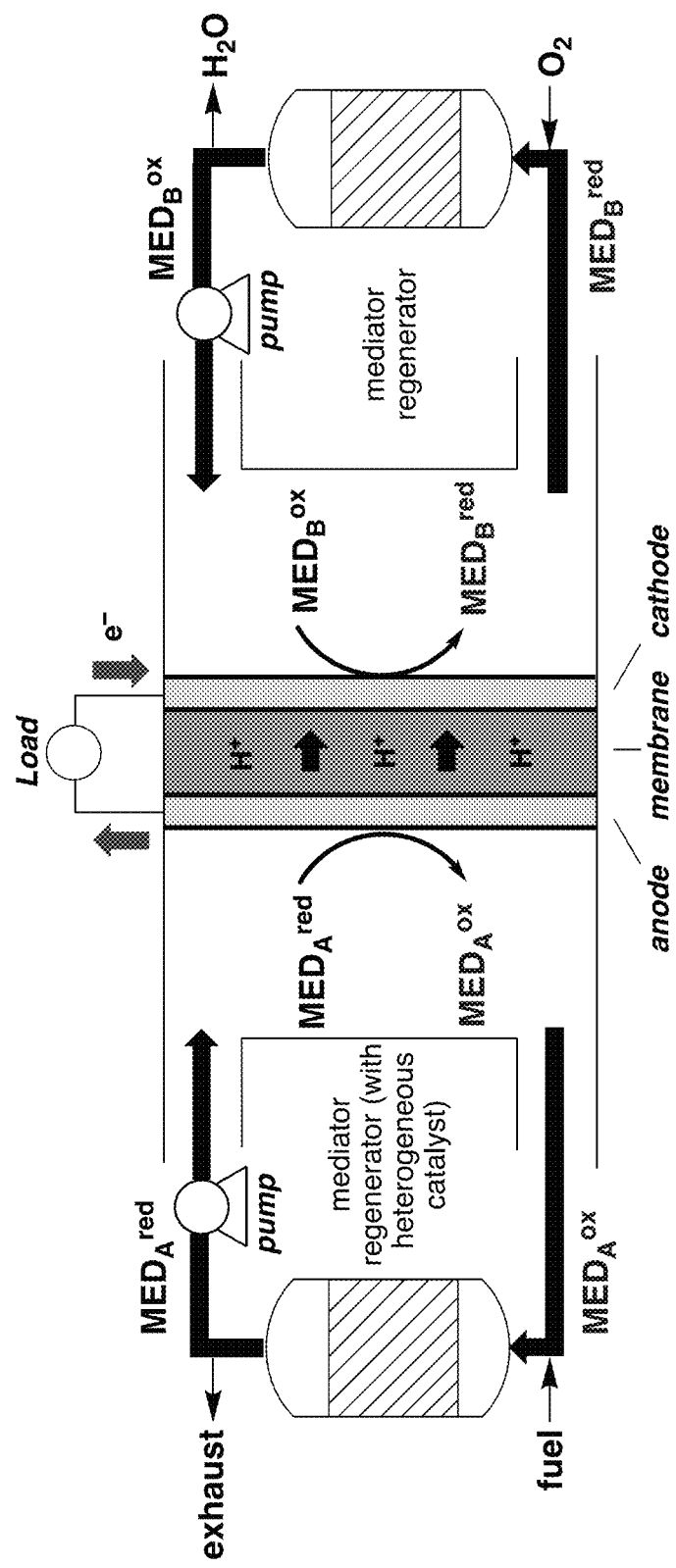
FIG. 6 depicts a general scheme for a flow-anode based fuel cell that also includes a flow-based cathode.

Having demonstrated a regenerative redox anode, we then proceeded to integrate it with a regenerative redox cathode using $O_2$ as the oxidant. A general scheme for a fuel cell using mediators at both electrodes is given in FIG. 6.

A reservoir beaker was filled with 0.1 M of the 2,3,5,6-tetrakis(ethylsulfanyl-2'-sulfonate)-1,4-hydroquinone tetrasodium salt (tetraMESNA) in 1 M $H_2SO_4$. A working electrode (glassy carbon) and a reference electrode (Ag/AgCl) were immersed in the solution to monitor the potential. The measured potential was converted to a quinone:hydroquinone ratio using the Nernst equation. A pump circulated the contents of the reservoir through a reactor containing 4.4 g of a 10 wt. % Pt/C catalyst. $O_2$ flowed co-current to the electrolyte. A heating tape wrapped around the reactor maintained the temperature at 50° C. After reacting over the catalyst, the electrolyte solution was returned to the reservoir.

Another reservoir beaker was filled with 0.1 M of the anthraquinone-2,7-disulfonic acid, disodium salt in 1 M $H_2SO_4$. A working electrode (glassy carbon) and a reference electrode (Ag/AgCl) were immersed in the solution to monitor the potential. The measured potential was converted to a quinone:hydroquinone ratio using the Nernst equation. A pump circulated the contents of the beaker through a reactor containing 0.1 g of Pt dispersed on carbon (10 wt. % loading). Hydrogen was metered in co-current flow to the electrolyte. After reacting over the catalyst, the electrolyte was returned to the reservoir.

The fuel cell consisted of a membrane electrode assembly (MEA) of Nafion®115 (Dupont). On both the anode and cathode side, carbon fiber cloth was laid against the membrane without hot pressing. Both sides had an electrode area of 5 cm$^2$ and used serpentine flow plates. The fuel cell was heated to 60° C.

Figure 7:
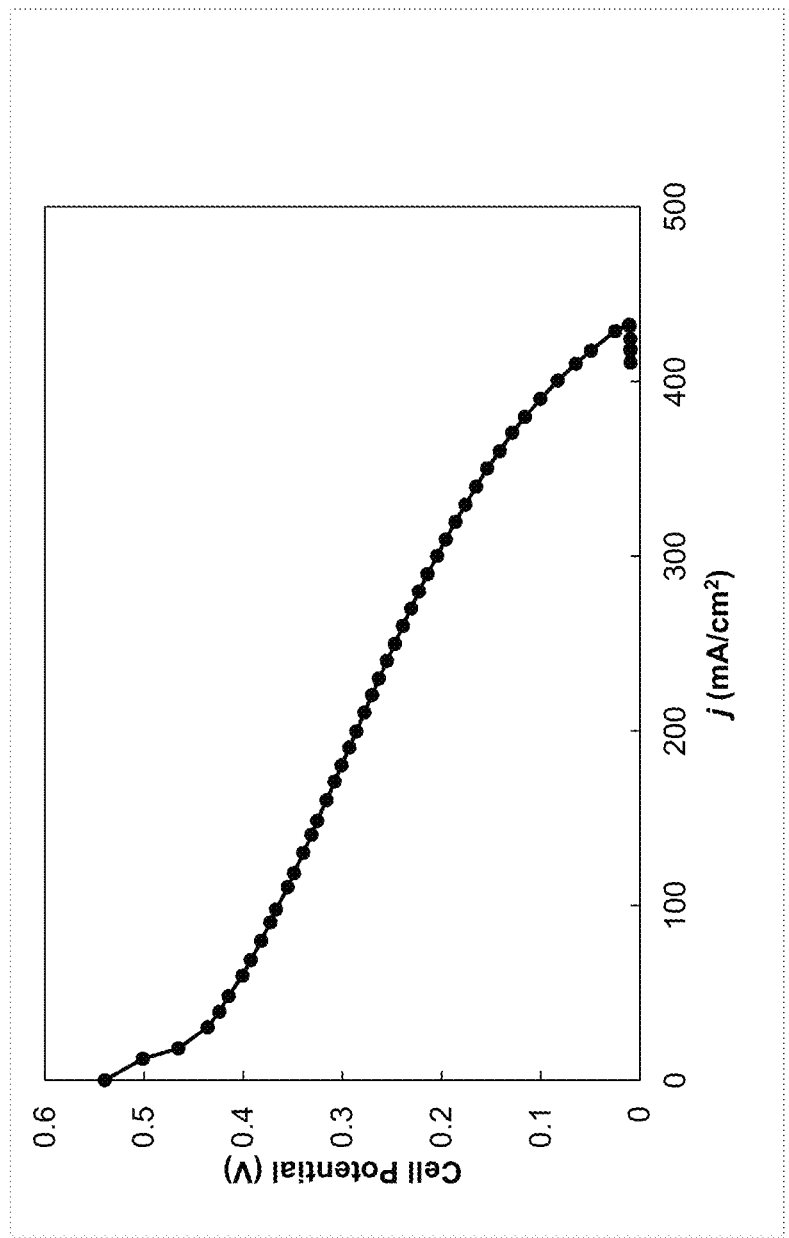
FIG. 7 depicts a voltage-current density plot for a fuel cell with a flow anode using anthraquinone-2,7-disulfonic acid, disodium salt as the anodic redox mediator, Pt/C as the redox catalyst, and $H_2$ as the fuel, and a flow cathode using 2,3,5,6-tetrakis(ethylsulfanyl-2'-sulfonate)-1,4-hydroquinone tetrasodium salt as the cathodic redox mediator, Pt/C as the redox catalyst, and $O_2$ as the oxidant.

Once the anode reservoir contained at least 50% anthrahydroquinone and the cathode reservoir contained at least 50% tetraMESNA quinone (according to the measured potentials), two other pumps were turned on and circulated the contents of the reservoirs to the anode and cathode, respectively. At the cathode electrode, the tetraMESNA quinone was reduced to the hydroquinone and the electrolyte was circulated back to the cathode reservoir. At the anode electrode, the disulfonated anthrahydroquinone was oxidized to the anthraquinone and the electrolyte was circulated back to the anode reservoir. A voltage-current density plot was generated during simultaneous operation of both reactors and the fuel cell (FIG. 7).

EXAMPLE 3

Anthraquinone Mediated Anode with Polyoxometalate Mediated Cathode

Figure 8:
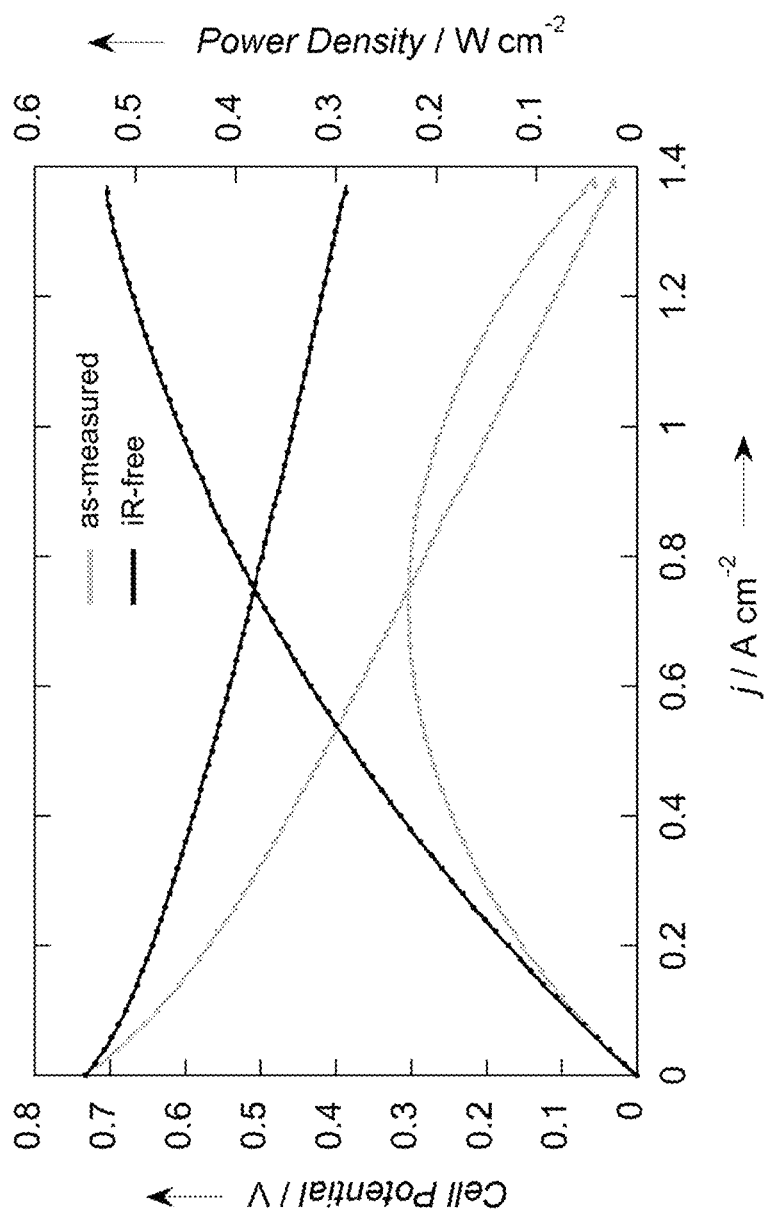
FIG. 8 depicts a voltage-current density plot for a fuel cell with a flow anode using anthraquinone-2,7-disulfonic acid, disodium salt as the anodic redox mediator, Pt/C as the redox catalyst, and $H_2$ as the fuel, and a flow cathode using the polyoxometalate $Na_4H_3PMo_8V_4O_{40}$ as the combined cathodic redox mediator and catalyst, and $O_2$ as the oxidant.

Operation of an anthraquinone-mediated anode was also demonstrated with a cathode mediated by the polyoxometalate (POM) $Na_4H_3PMo_8V_4O_{40}$. A 0.3 M solution of the POM was synthesized according to the process disclosed by Odyakov et al. (*React. Kinet. Catal. Lett.* 2008, 95, 21-28.). During fuel cell experiments, the POM solution was stored in a three-neck flask heated to 80° C. The solution was circulated to the fuel cell cathode from one neck and returned to a second neck, while an oxygen sparger was inserted into the solution through the third neck. The POM functioned as both the mediator and catalyst, thus, no additional catalyst was added to the flask. The membrane electrode assembly was arranged in the manner used with the quinone-mediated cathode. The anthraquinone solution and reduction reactor were arranged in the manner described previously, except for the following modifications. The reservoir contained 1 M anthraquinone-2,7-disulfonic acid (ion-exchanged) in 1 M $H_2SO_4$. The reactor contained 0.5 g of the 10 wt. % Pt/C catalyst. A voltage-current density plot was generated during simultaneous operation of both reactors and the fuel cell once both solutions exhibited a state of charge over 50% (FIG. 8). The maximum power density was 228 mW/cm$^2$ and the iR-corrected power density was 528 mW/cm$^2$.

Figure 9:
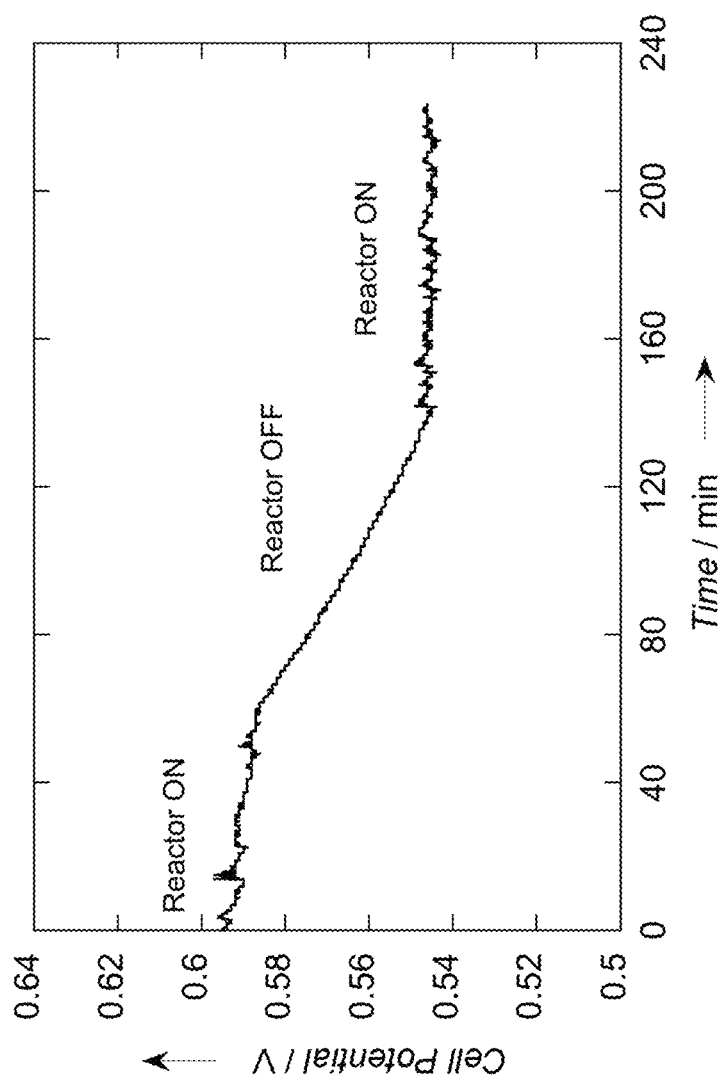
FIG. 9 depicts a constant current experiment for a fuel cell with a flow anode using anthraquinone-2,7-disulfonic acid, disodium salt as the anodic redox mediator, Pt/C as the redox catalyst, and $H_2$ as the fuel, and a flow cathode using the polyoxometalate $Na_4H_3PMo_8V_4O_{40}$ as the combined cathodic redox mediator and catalyst, and $O_2$ as the oxidant.

A constant current experiment (conducted at 50 mA/cm$^2$, total current of 0.25 A) demonstrated the on-demand operation of the hydrogenation reactor. During the first hour of operation, $O_2$ and $H_2$ flowed through their respective reactors and a steady voltage was maintained. After approximately one hour of operation, $H_2$ flow to the anode reactor was stopped, preventing any further anthraquinone reduction. The observed fuel cell voltage immediately began to drop, corresponding to a decrease in the amount of anthrahydroquinone. $H_2$ flow to the reactor was reinitiated after 84 minutes, enabling further reduction of the anthraquinone and stabilizing the cell potential (FIG. 9). This experiment confirmed that the fuel cell potential was sustained by continuous reduction of the anthraquinone in the packed bed reactor rather than flow of a pre-reduced solution.

EXAMPLE 4

Spectroelectrochemical Measurements of Anthraquinone and Anthrahydroquinone

In earlier examples, we demonstrated the implementation of a regenerative redox anode using anthraquinone-2,7- disulfonic acid disodium salt and hydrogen. In the following examples we demonstrate that this quinone can undergo reduction with other fuels.

Figure 10:
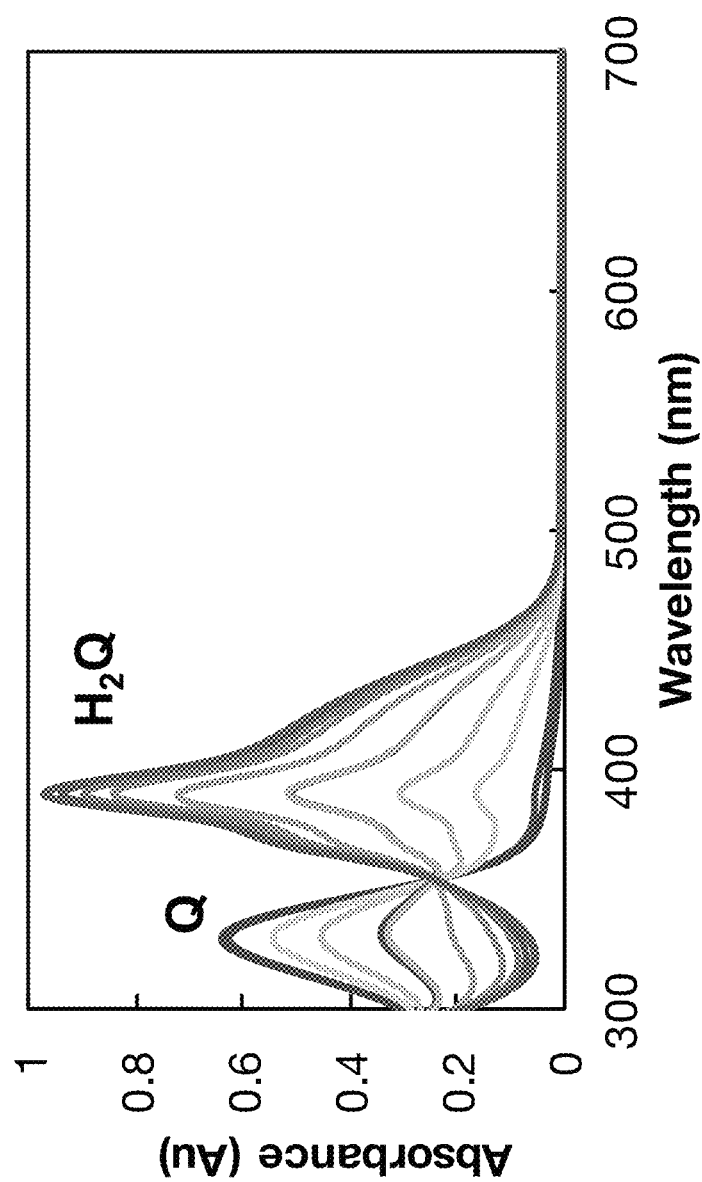
FIG. 10 depicts UV-Visible spectra for mixtures of anthraquinone-2,7-disulfonic acid, disodium salt, and anthrahydroquinone-2,7-disulfonic acid, disodium salt generated via electrolysis methods.

In one example, spectroelectrochemistry was used to develop an assay for monitoring the reduction of the anthraquinone. 1 mM of anthraquinone-2,7-disulfonic acid disodium salt was dissolved in water, with 1 M $H_2SO_4$ as supporting electrolyte. The solution was placed into a UV-Vis cuvette, along with a working electrode (Pt grid), a counter electrode (Pt), and a reference electrode (Ag/AgCl). The electrodes were connected to a potentiostat and a potential was applied to the contents of the cell. The application of different potentials led to different quinone:hydroquinone ratios. At each of the applied potentials, a UV-Vis trace was collected, revealing an anthraquinone peak at 328 nm and an anthrahydroquinone peak at 389 nm (FIG. 10).

EXAMPLE 5

Figure 11:
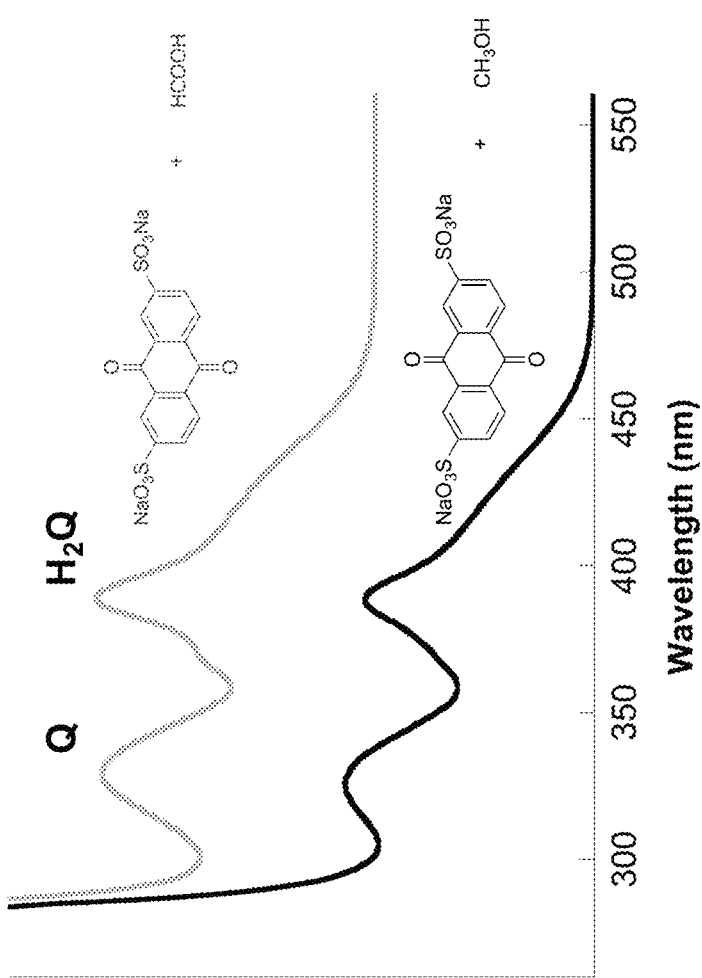
FIG. 11 depicts UV-Visible spectra for transfer hydrogenation between anthraquinone-2,7-disulfonic acid, disodium salt and formic acid or MeOH under acidic conditions.

Reduction of Anthraquinone by Formic Acid with a Heterogeneous Catalyst 0.4 M anthraquinone 2,7-disulfonic acid disodium salt was dissolved in water with 2 M formic acid. The solution, along with 23 mg of Pt dispersed on C (10 wt. % loading, 1.5 mol % Pt relative to the anthraquinone), was placed in a pressure reactor. The reactor was purged with $N_2$ and heated to 50° C. After 3 h of reaction, the heat was turned off and the reactor was allowed to cool down. Upon cooling, the catalyst was filtered off and the filtrate was diluted with 1 M $H_2SO_4$ for UV-Vis analysis. The UV-Vis trace indicated the presence of anthrahydroquinone (FIG. 11), indicating that reduction of the anthraquinone occurred using formic acid as the reductant.

EXAMPLE 6

Reduction of Anthraquinone by MeOH with a Heterogeneous Catalyst 0.2 M anthraquinone 2,7-disulfonic acid disodium salt was dissolved in 1 M $H_2SO_4$ with 2 M MeOH. The solution, along with 15 mg of Pt dispersed on C (10 wt. % loading, 2.5 mol % Pt relative to the anthraquinone), was placed in a pressure reactor. The reactor was purged with $N_2$ and heated to 85° C. After reaction, the heat was turned off and the reactor was allowed to cool down. Upon cooling, the catalyst was filtered off and the filtrate was diluted with 1 M $H_2SO_4$ for UV-Vis analysis. The UV-Vis trace indicated the presence of anthrahydroquinone (FIG. 11), indicating that reduction of the anthraquinone occurred using MeOH as the reductant.

EXAMPLE 7

Reduction of Anthraquinone by EtOH with a Heterogeneous Catalyst 0.2 M anthraquinone 2,7-disulfonic acid disodium salt was dissolved in 1 M $H_2SO_4$ with 2 M EtOH. The solution, along with 15 mg of Pt dispersed on C (10 wt. % loading, 2.5 mol % Pt relative to the anthraquinone), was placed in a pressure reactor. The reactor was purged with $N_2$ and heated to 85° C. After reaction, the heat was turned off and the reactor was allowed to cool down. Upon cooling, the catalyst was filtered off and the filtrate was diluted with 1 M $H_2SO_4$ for UV-Vis analysis. The UV-Vis trace indicated the presence of anthrahydroquinone, indicating that reduction of the anthraquinone occurred using EtOH as the reductant. This and previous examples illustrate that this class of redox mediators can be reduced by fuels other than hydrogen. By extension, such fuels can be implemented in a regenerative redox anode in place of $H_2$.

Summary

In sum, these examples demonstrate that a carbon-containing redox mediator can be used in conjunction with a heterogeneous redox catalyst that is not in direct contact with the anode electrode to form a working anode half-cell where a fuel or other reductant is being oxidized.

While a number of embodiments of the present invention have been described above, the present invention is not limited to just these disclosed examples. There are other modifications that are meant to be within the scope of the invention and claims. Thus, the claims should be looked to in order to judge the full scope of the invention.

We claim:

1. An anode half-cell for oxidizing a fuel or other reductant, the anode half-cell comprising:
    an electrolyte solution (anolyte) that is in contact with an electrode (anode) and a heterogeneous redox catalyst, wherein the electrode is not in direct contact with the heterogeneous redox catalyst; and
    a redox mediator comprising at least one carbon atom, wherein the redox mediator is capable of transferring or accepting electrons and protons while undergoing reduction or oxidation.

2. The anode half-cell of claim 1, wherein the redox mediator is dissolved within the electrolyte solution and is capable of moving between the electrode and the heterogeneous redox catalyst.

3. The anode half-cell of claim 1, further comprising a fuel or other reductant.

4. The anode half-cell of claim 1, wherein the reduced form of the redox mediator is selected from the group consisting of substituted dihydroxybenzenes, substituted hydrazines, substituted hydroxylamines, and substituted heterocycles, such as dihydropyridines, dihydroflavins, or dihydroindigos.

5. The anode half-cell of claim 4, wherein the substituted dihydroxybenzene is a 1,2-dihydroxybenzene or a 1,4-dihydroxybenzene.

6. The anode half-cell of claim 4, wherein the substituted dihydroxybenzene has one or more dihydroxybenzene hydrogen atoms on the ring substituted with a substituent group that is independently selected from the group consisting of an alkyl with less than ten carbons, an aryl, a fused aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, and combinations of two or more of the foregoing; and wherein at least one of the substituent groups is charged to increase the aqueous solubility of the substituted dihydroxybenzene.

7. The anode half-cell of claim 6, wherein the fused aryl is selected from the group consisting of naphthohydroquinone, anthrahydroquinone, and derivatives thereof.

8. The anode half-cell of claim 4, wherein the substituted hydrazine has one or more hydrazine hydrogen atoms substituted with a substituent group that is independently selected from the group consisting of an alkyl with less than ten carbons, an aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, and combinations of two or more of the foregoing; and wherein at least one of the substituent groups is charged to increase the aqueous solubility of the substituted hydrazine.

9. The anode half-cell of claim 4, wherein the substituted hydroxylamine has one or more nitrogen-bound hydroxylamine hydrogen atoms substituted with a substituent group that is independently selected from the group consisting of an alkyl with less than ten carbons, an aryl, a cycloalkyl, and a bicycloalkyl.

10. The anode half-cell of claim 9, wherein one or more of the substituent groups further comprises an alkyl with less than ten carbons, an aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, and combinations of two or more thereof on the same or on different positions on the substituent; and wherein at least one of the substituents is charged to increase the aqueous solubility of the substituted hydroxylamine.

11. The anode half-cell of claim 4, wherein the substituted heterocycle, such as a dihydropyridine, dihydroflavin, or dihydroindigo, has one or more heterocycle hydrogen atoms substituted with a substituent group that is selected from the group consisting of an alkyl with less than ten carbons, an aryl, a heterocycle, an alkenyl, an alkynyl, a cycloalkyl, an amine, a protonated amine, a quaternary amine, sulfate, a sulfonate, a mercaptoalkylsulfonate, sulfonic acid, phosphate, a phosphonate, a phosphinate, a ketone, an aldehyde, an oxime, a hydrazine, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, a nitro, and combinations of two or more thereof on the same or on different positions on the substituent; and wherein at least one of the substituents is charged to increase the aqueous solubility of the substituted heterocycle.

12. The anode half-cell of claim 1, wherein the heterogeneous redox catalyst comprises one or more metals selected from the group consisting of Pt, Pd, Ru, Co, Mn, Fe, Cu, V, Mo, Rh, Ag, Au, W, Os, Ni, Cr, and Ir.

13. The anode half-cell of claim 1, further comprising an anode flow reactor containing the heterogeneous redox catalyst, wherein the anode flow reactor is configured to facilitate contact of the heterogeneous redox catalyst with a flowing fluid comprising the electrolyte solution, the redox mediator, and a fuel or other reductant.

14. An electrochemical cell comprising the anode half-cell of claim 1 in fluid communication with a cathode half-cell.

15. The electrochemical cell of claim 14, wherein the electrochemical cell is a fuel cell or an electrosynthetic cell.

16. The electrochemical cell of claim 14, further comprising:
a cathode inlet configured to allow $O_2$ or air to flow into the cathode half-cell, whereby $O_2$ can be reduced;
an anode inlet configured to allow a gaseous or liquid fuel or other reductant to be delivered to the anode half-cell, whereby the fuel or other reductant can be oxidized;
a semi-permeable membrane separating the anode half-cell and the cathode half-cell; and
an external electrical circuit connecting the anode half-cell and the cathode half-cell.

17. The electrochemical cell of claim 16, wherein the cathode half-cell comprises:
an electrolyte solution (catholyte) that is in contact with a cathode electrode (cathode) and a heterogeneous redox catalyst, wherein the cathode electrode is not in direct contact with the heterogeneous redox catalyst; and
a redox mediator comprising at least one carbon atom, wherein the redox mediator is capable of transferring or accepting electrons and protons while undergoing reduction or oxidation.

18. The electrochemical cell of claim 16, wherein the cathode half-cell comprises:
an electrolyte solution (catholyte) that is in contact with a cathode electrode (cathode) and contains a soluble redox mediator and/or redox catalyst.

19. The electrochemical cell of claim 18, wherein the soluble redox mediator and/or redox catalyst comprises a polyoxometalate (POM).

20. A method of producing electricity or producing a desired chemical product, comprising contacting the heterogeneous redox catalyst of the anode half-cell of the electrochemical cell of claim 14 with a fuel or reductant that is a precursor of the desired chemical product, and contacting the cathode half-cell of the electrochemical cell of claim 14 with $O_2$, whereby the fuel is oxidized, $O_2$ is reduced, and electricity is produced; or whereby the precursor is oxidized to the desired product, and the $O_2$ is reduced.

* * * * *